(12) United States Patent
Dias et al.

(10) Patent No.: US 10,409,817 B1
(45) Date of Patent: Sep. 10, 2019

(54) DATABASE SYSTEM AND METHODS FOR DOMAIN-TAILORED DETECTION OF OUTLIERS, PATTERNS, AND EVENTS IN DATA STREAMS

(71) Applicant: EMC Corporation, Hopkinton, MA (US)

(72) Inventors: Jonas F. Dias, Rio de Janeiro (BR); Diego Salomone Bruno, Niterói (BR); André de Almeida Maximo, Rio de Janeiro (BR); Adriana Bechara Prado, Rio de Janeiro (BR); Vinícius Michel Gottin, Rio de Janeiro (BR); Monica Barros, Rio de Janeiro (BR)

(73) Assignee: EMC Corporation, Hopkinton, MA (US)

( * ) Notice: Subject to any disclaimer, the term of this patent is extended or adjusted under 35 U.S.C. 154(b) by 727 days.

(21) Appl. No.: 15/080,756

(22) Filed: Mar. 25, 2016

(51) Int. Cl.
*G06F 16/2455* (2019.01)
*G06F 16/22* (2019.01)
*G06F 16/2458* (2019.01)

(52) U.S. Cl.
CPC .... *G06F 16/24568* (2019.01); *G06F 16/2237* (2019.01); *G06F 16/2282* (2019.01); *G06F 16/2477* (2019.01)

(58) Field of Classification Search
USPC ......................................................... 707/745
See application file for complete search history.

(56) References Cited

U.S. PATENT DOCUMENTS

| 7,783,510 | B1 * | 8/2010 | Gilgur | G06Q 10/00 |
| | | | | 705/7.25 |
| 2003/0023591 | A1 * | 1/2003 | Ma | G06F 7/02 |
| 2003/0078686 | A1 * | 4/2003 | Ma | G06F 7/02 |
| | | | | 700/91 |

(Continued)

OTHER PUBLICATIONS

Taylor et al., "CODASYL Data-Base Management Systems", ACM Comput Surv 1976;8:67-103.

(Continued)

*Primary Examiner* — Cam Linh T Nguyen
(74) *Attorney, Agent, or Firm* — Ryan, Mason & Lewis, LLP (57) ABSTRACT

Methods and apparatus are provided for domain-tailored detection of outliers, patterns, and/or events in data streams. An exemplary method comprises obtaining a domain-dependent definition of (i) data outliers based on predefined outlier criteria; (ii) data patterns based on predefined pattern criteria; and/or (iii) data events based on predefined event criteria; obtaining time series measurement data from a plurality of sensors; determining, substantially simultaneously with the obtaining, whether individual samples satisfy the domain-dependent definitions of the data outliers, data patterns and/or data events; and storing the individual samples with an indication of whether the individual samples satisfy the domain-dependent definitions of the data outliers, data patterns and/or data events. The domain-dependent definitions are optionally specified using a declarative command language. Query are optionally processed comprising one or more declarative statements that reference and/or manipulate the data outliers, data patterns and/or data events.

20 Claims, 9 Drawing Sheets

(56) References Cited

U.S. PATENT DOCUMENTS

| | | | | |
|---|---|---|---|---|
| 2004/0254901 | A1* | 12/2004 | Bonabeau | G06N 3/126 |
| | | | | 706/13 |
| 2008/0222109 | A1* | 9/2008 | Sakurai | G06F 17/30551 |
| 2010/0161810 | A1* | 6/2010 | Vaidyanathan | G06F 11/3006 |
| | | | | 709/228 |
| 2013/0031139 | A1* | 1/2013 | Chen | G06F 17/30415 |
| | | | | 707/802 |
| 2013/0226892 | A1* | 8/2013 | Ehsani | G06F 17/30864 |
| | | | | 707/706 |
| 2016/0239755 | A1* | 8/2016 | Aggour | G05B 23/0229 |
| 2016/0239756 | A1* | 8/2016 | Aggour | G05B 23/0229 |
| 2017/0279616 | A1* | 9/2017 | Loeb | H04L 67/22 |

OTHER PUBLICATIONS

Chan et al., "Bitmap index design and evaluation", ACM SIGMD Rec 1998;27:355-66.

* cited by examiner

```
                                                          ┌─ 700
CREATE TABLE my_sensor (
        key        timestamp,
        value      double precision
               WITH OUTLIER DETECTION 'M1' USING iqr(k=1.5)
               WITH OUTLIER DETECTION 'M2' USING percentile(min=1, max=99)
               WITH OUTLIER DETECTION 'M3' USING kmeans (d=5)
               WITH OUTLIER DETECTION 'M4' USING my_new_func()
)
-- OPTION A:
SELECT key, value FROM my_sensor
WITHOUT OUTLIER USING ALL ('M1', 'M2', 'M3', 'M4');

-- OPTION B:
SELECT key, value FROM my_sensor
WITHOUT OUTLIER USING ANY ('M1', 'M2', 'M3', 'M4');

-- OPTION C:
SELECT key, value FROM my_sensor
WITHOUT OUTLIER USING MAJORITY ('M1', 'M2', 'M3', 'M4', t=0.5);
```

FIG. 8

```
                                                          ┌─ 800
SELECT
        key,
        CASE
                WHEN NOT OUTLIER 'a_out' THEN value_a
                ELSE interpolate(Log(key), Log(value_a), Lead(key), Lead(value_a)) OVER w
        END
FROM my_sensor
WINDOW w AS (ORDER BY key WITHOUT OUTLIER)
```

*FIG. 9*

```
900 ─  CREATE TABLE my_sensor
       (
           key          timestamp,
           value_b      double precision
                WITH PATTERN DETECTION 'cumsum' USING cumsum_test()
910 ─      (...)
```

| 270 |
|---|
| BITMAP INDEXING |

0111111111111101111111111111110111111111111111011111111111111 ← 920
IS CUMULATIVE?

*FIG. 10*

```
1000
SELECT
        key,
        CASE
                WHEN PATTERN 'cumsum' THEN (value_b - Lag(value_b) OVER w)
                ELSE value_b
        END
FROM my_sensor
WINDOW w AS (ORDER BY key)
```

FIG. 11

FIG. 12

```
SELECT
        key
FROM my_sensor
WHERE EVENT 'OFF' IS TRUE
ORDER BY key
```
1200

FIG. 13

```
SELECT
        count (key)
FROM my_sensor
WHERE EVENT 'E1' OCCURS WITHIN interval '1 Day' BEFORE EVENT 'OFF'
ORDER BY key
```
1300

FIG. 14 too long tion, storage, and processing devices. It is to be appreciated, however, that the invention is not restricted to use with the particular illustrative configurations shown. Aspects of the present invention provide methods and apparatus for domain-tailored detection of outliers, patterns, and/or events in data streams.

In one or more embodiments, a database system is provided that is aware of the application domain. More specifically, an exemplary database system learns how to identify up to three types of elements when dealing with ingested data streams, namely, outliers, patterns, and/or events, based on domain requirements configured by the user. Once the elements to be identified have been learned by the database system, the disclosed database system can automatically annotate such elements at data ingestion time (e.g., the annotation is substantially simultaneous with the data ingestion). Since data streams often have a strong dynamic nature, users can optionally redefine the characteristics of an outlier and define new kinds of patterns and/or events of interest (or redefine characteristics of existing patterns and/or events of interest). In one or more embodiments, each element of the ingested data has an associated bitmap index indicating whether or not the data element is one or more of an outliers and/or part of a pattern and/or an event.

In one or more embodiments, outliers, patterns, and/or events are defined by the user via an extended query language, e.g., an extension of SQL (Structured Query Language) with a particular data definition language (DDL) that is provided by the database system. See, for example, R. W. Taylor and R. L. Frank, "CODASYL Database Management Systems," ACM Computing Surveys, No. 8, pages 67-103 (1976), incorporated by reference herein in its entirety. Generally, a Data Definition Language (DDL) is a standard for commands that define the different structures in a database. DDL statements create, modify, and/or remove database objects, such as tables, indexes, and users. The DDL language gives the user the ability to "teach" the system, in a declarative way, a definition of outliers, patterns, or events, along with the creation of a table that is going to store the incoming data.

Analogously, at query time, the user can declaratively refer to the pre-annotated outliers, patterns and/or events within his or her query. This is also possible via particular data manipulation language (DML) statements provided by the database system (see, for example, R. W. Taylor and R. L. Frank, referenced above). Generally, a data manipulation language (DML) is a family of syntax elements used for selecting, inserting, deleting and/or updating data in a database. For example, a user may be interested in querying data samples that contain outliers and a given pattern of interest. One or more aspects of the invention allow the outliers, patterns and/or events implicitly present in the data to be retrieved, in a declarative way. In this manner, data scientists can achieve faster and more accurate results in data analysis tasks.

As noted above, when information systems collect data streams from sensors, they are often subject to measurement errors that might be associated with the numerical precision of the equipment, environmental conditions or faulty behavior. It is also common to check for specific patterns on the observed series as well as for events of interest within the domain. In addition, such events may create disturbances on the data streams that can change the upcoming behavior of the series. The results can be wrong or biased if the analysis ignores the occurrence of such events.

Existing time series and data streaming databases designed to store and query data efficiently; however, they are not designed to automatically learn characteristics of the data that might indirectly affect future queries. Existing database systems allow users to query for a subset of data based on logical restrictions on a data model. For instance, users can query for sets of measured values above a given threshold, but they cannot declaratively query for all outliers in the data or, similarly, query for all occurrences of particular patterns or events. This is due to the fact that outliers, patterns and events are implicitly present in the data and are, above all, domain-dependent. Aspects of the present invention recognize that the identification of outliers, patterns and/or events requires a domain-tailored pre-processing step. Typically, database users solve this problem by analyzing and adjusting the data manually or programming user-defined functions (UDF) that are put on top of query execution plans leading to poor performance, even on massively parallel databases.

With the growth of the Internet-of-Things and other streaming services on the Web, it might be impractical to employ manual approaches to preprocess and annotate data streams. For example, data streams change over time, as well as their outliers. Thus, a manually made analysis will eventually get outdated. In addition, such large sensor networks produce very large datasets very quickly. Thus, it is impractical to individually adjust and analyze all of the data in order to remove outliers, detect patterns and/or classify events. Further, real-time systems require quick answers. Pre-processing tasks, such as outlier removal, however, take precious time from data scientists.

Figure 1:
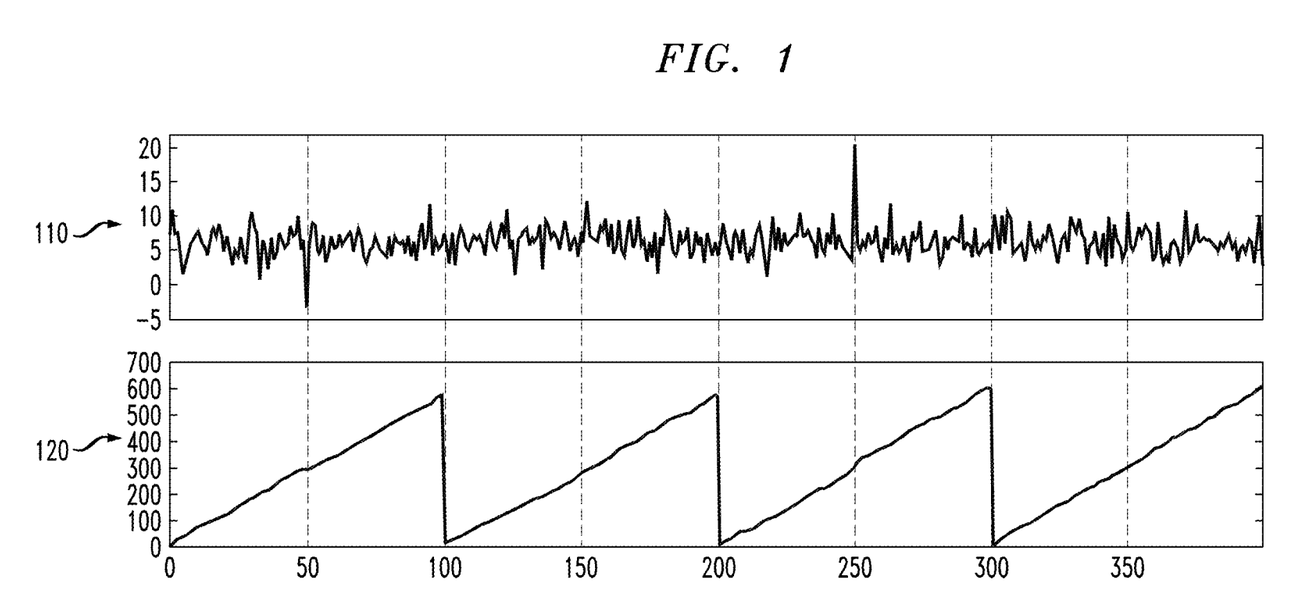

FIG. 1 illustrates two exemplary alternative representations (110 and 120) of the same time series data. One or more aspects of the invention recognize that sensor data might not be ready for analysis since the sensor data might be stored in an unsuitable representation, depending on a sensor configuration. As shown in FIG. 1, data might be stored with an original representation 110 that uses the original values or the same data might be stored with an accumulated representation 120 that uses accumulated values. If a user is not aware of the representation that has been stored, a statistical analysis based on the accumulated time series, instead of the intended original values, may yield incorrect results.

As used herein, a "database system" comprises computer software that organizes a set of data and their relationships, allowing for data storage and retrieval in a controlled and managed fashion. As data is ingested into the disclosed database system, the samples in the measured data are annotated and indexed with one or more of the following characteristics (i) whether individual samples are an outlier or a non-outlier (e.g., normal data); (ii) whether a sequence of samples satisfies one or more predefined pattern criteria; (iii) whether a sequence of samples satisfies one or more predefined event criteria.

Figure 2:
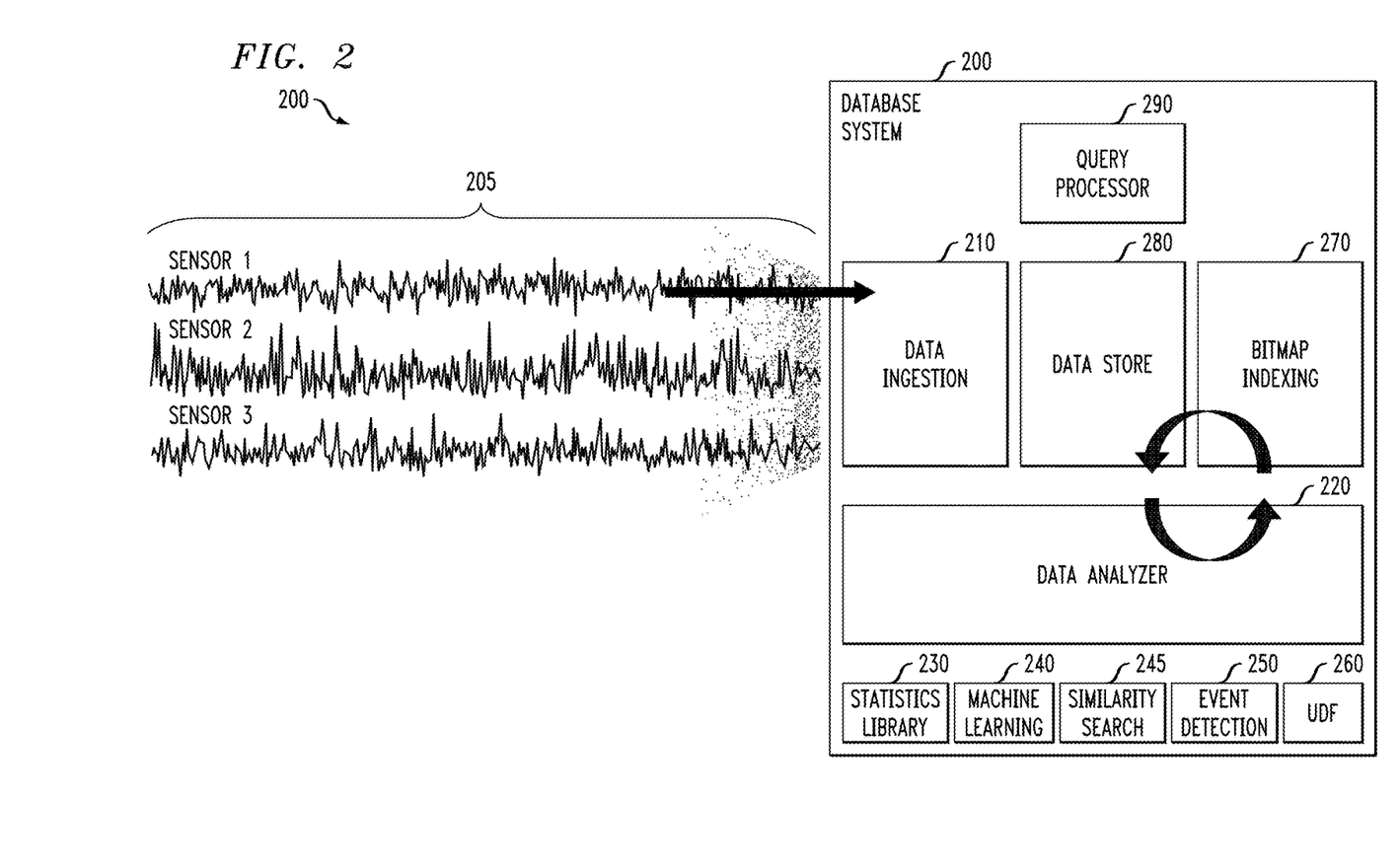

FIG. 2 illustrates a database system 200 according to one embodiment of the invention. As shown in FIG. 2, a data ingestion component 210 loads and stores incoming data 205, from a number of different sensors, such as exemplary sensors 1 through 3. In one or more embodiments, a data analyzer component 220 analyzes the ingested data 205, substantially simultaneously with the data ingestion. The data analyzer component 220 annotates the measured values as being one or more of outliers, patterns, and events, as discussed further below in conjunction with FIGS. 4 through 13, according to a given method using one or more of statistical libraries 230, machine learning methods 240, similarity search methods 245, specialized event detection libraries 250, or user-defined functions (UDF) 260.

The result of the data analysis by the data analyzer component 220 is materialized in the form of a bitmap index, as discussed further below in conjunction with FIG. 4, generated by bitmap indexing component 270. Generally, the bitmap index indicates whether individual measured values are one or more of outliers, patterns, and events. See, for example, C-Y Chan and Y. E. Ioannidis, "Bitmap Index Design and Evaluation," ACM SIGMOD Record, No. 27, pages 355-66 (1998), incorporated by reference herein in its entirety.

The annotated and indexed data is stored in a data store 280. Query processor 290 allows users to perform queries on the stored data, as discussed further below.

Figure 3:
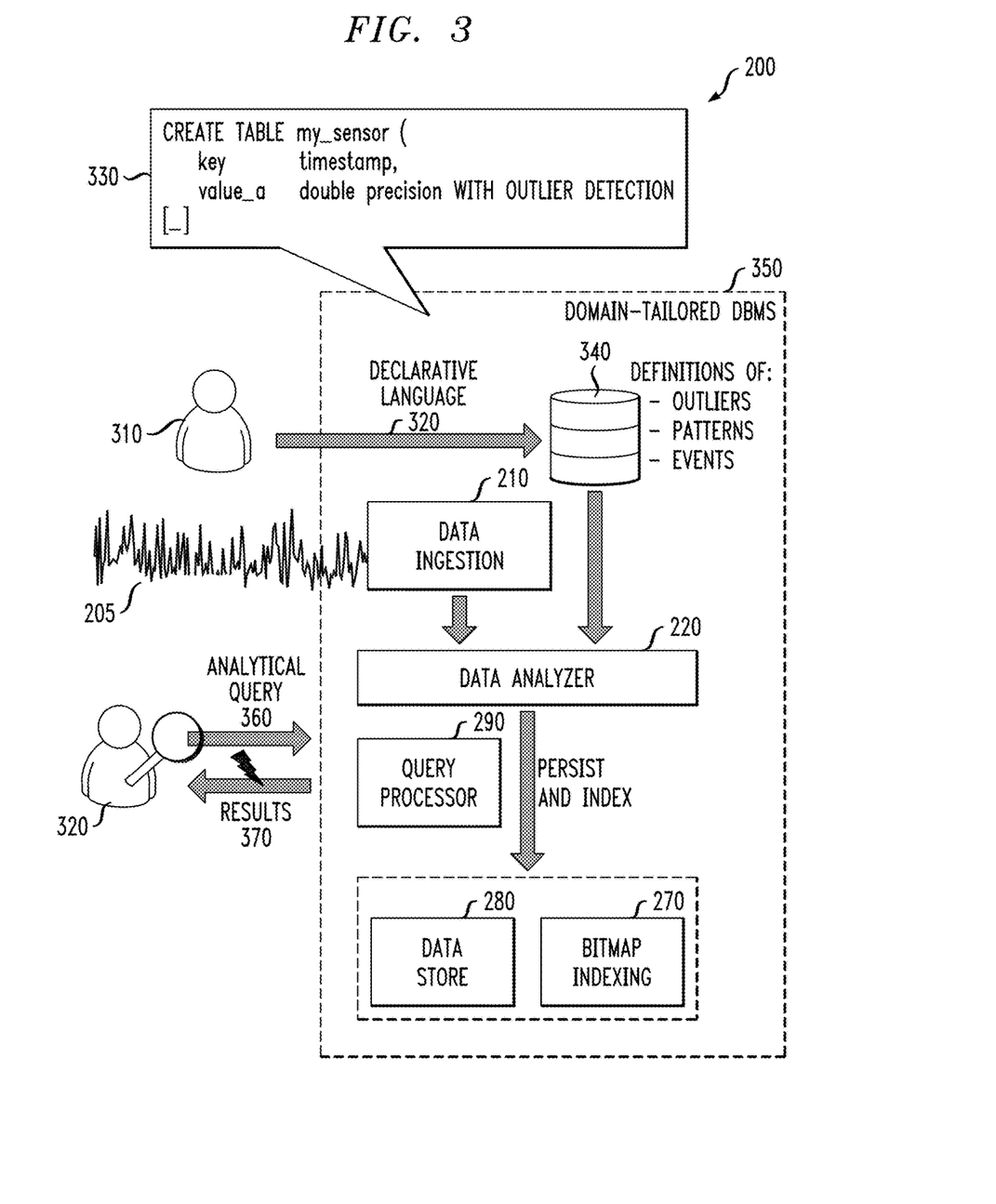

FIG. 3 illustrates aspects of the database system 200 of FIG. 2 in further detail. As shown in FIG. 3, a user 310 employs a declarative language 320, such as an extended SQL DDL statement 330, which creates a new table 'my_sensor', used to store the incoming data. The exemplary extended SQL DDL statement provides definitions 340 of one or more outliers, patterns and attributes, at the schema level. The exemplary extended SQL DDL statement 330 enables outlier detection for the sensor data.

In this manner, one or more aspects of the invention provide a domain-tailored database management system (DBMS) 350. The domain knowledge that the user 310 declares is structured by the database system 200 in such a way that it can use this information to index data at ingestion time. With this information, the data analyzer component 220 can run several routines to analyze incoming data streams and store them indexed in a domain-tailored database management system (DBMS).

The data ingestion component 210 loads and stores incoming data 205, from one or more sensors. In one or more embodiments, the data analyzer component 220 analyzes the ingested data 205, substantially simultaneously with the data ingestion. The data analyzer component 220 employs the user-specified definitions 340 to annotate the ingested data 205 as being one or more of outliers, patterns, and events, as discussed further below in conjunction with FIGS. 4 through 13.

The result of the data analysis by the data analyzer component 220 is materialized in the form of a bitmap index, as discussed further below in conjunction with FIG. 4, generated by bitmap indexing component 270. As noted above, the bitmap index indicates whether individual measured values are one or more of outliers, patterns, and events. The annotated and indexed data is persistently stored in a data store 280.

With traditional approaches, raw data streams are ingested and stored in a traditional database system, such as relational databases, object data stores, or key-value data stores. When data scientists need to analyze stored data, prior to running analytical queries, they need to perform data cleaning, indexing, and other data wrangling routines to detect outliers, transform undesired patterns into treatable data, and annotating events of interest. These routines might take a long time to be computed for large data sets.

A user 320 (which may be the same as user 310) submits an analytical query 360 of the data in the data store 280 to the query processor 290, as discussed further below. The query processor 290 provides the results 370 of the query 360 to the user 320. When the user 320 performs analytical queries 360, by referencing or accessing samples of interest (e.g., outliers, patterns and/or events), such tasks are accomplished much faster, relative to traditional approaches, due to the pre-computed indexes.

Figure 4:
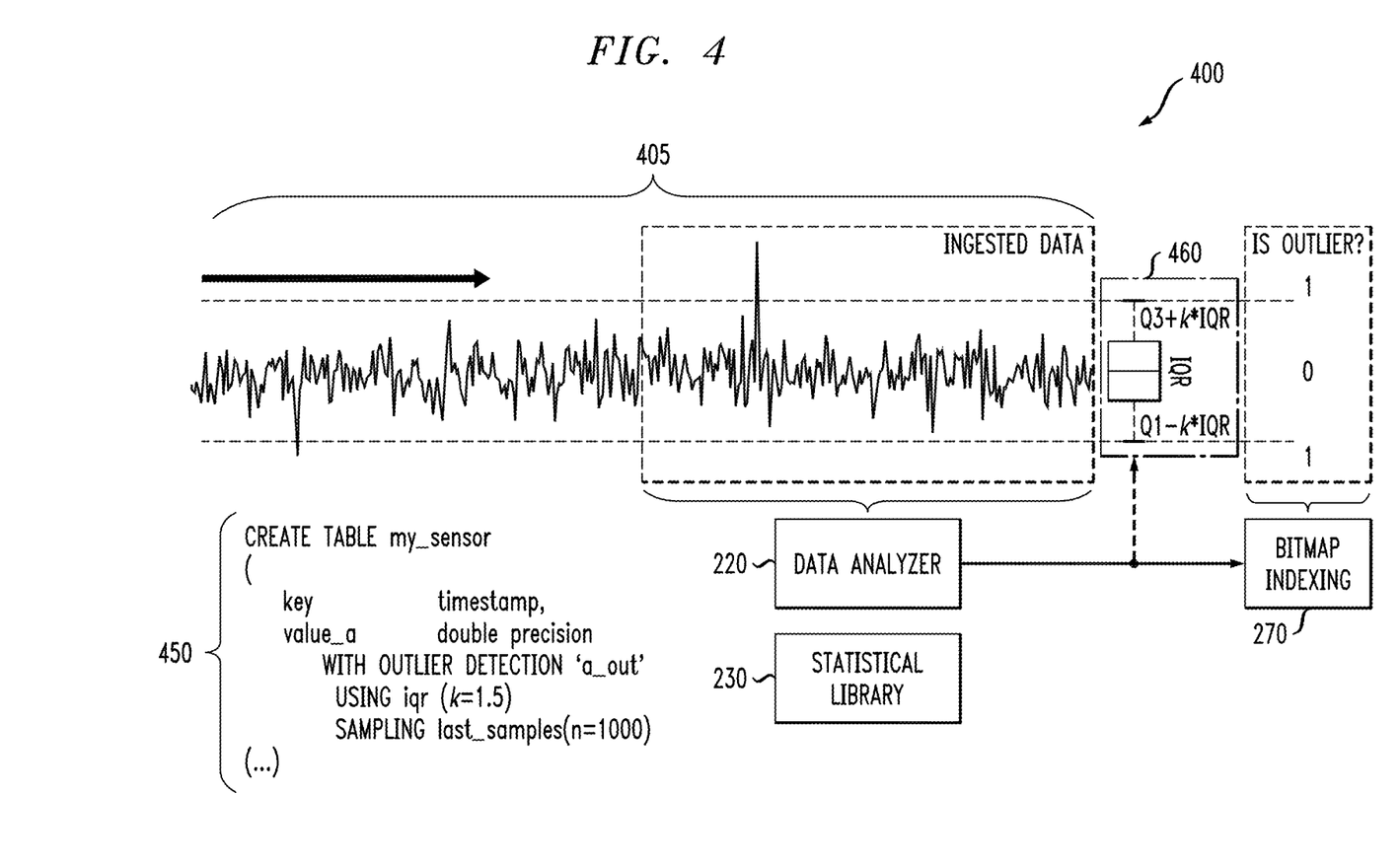

FIG. 4 illustrates an exemplary bitmap indexing process 400 for annotating ingested data 405 as an outlier (or not) using an exemplary statistical method. As shown in FIG. 4, as each measured sample of the ingested data 405 is ingested, the data analyzer 220 processes the measured sample to determine if the data is an outlier and the bitmap indexing component 270 updates a bitmap indicating whether the measured sample is an outlier (for example, a binary value of 1 can indicate an outlier).

FIG. 4 also includes pseudo code 450 that creates a new table 'my_sensor', used to store the incoming data, for example, using an extended SQL DDL statement. The extended SQL DDL statement specifies the attributes ('key' and 'value_a'), and the user can optionally specify that an outlier of type 'a_out' is a sample value characterized by function iqr(k=1.5). That is, in this example, an outlier is defined as a sample value in a given interquartile range (IQR), that is, k*IQR below the first quartile (Q1) and k*IQR above the third quartile (Q3). The user can also optionally specify the sampling selection criterion that specifies which and how many samples from ingested data are used to compute statistical metrics or to train models. That is, in this example, the sample method is an exemplary last_samples' function that selects the last one thousand samples from ingested data to estimate the first and third quartiles.

While ingesting the data 405 into the exemplary table 'my_sensor', the data analyzer 220 continuously computes the main statistics of such data, including the median and interquartile range (IQR), represented by the boxplot 460. Then, sample values that are k*IQR below Q1 or k*IQR above Q3 are indexed with a binary value 1 (the outliers of type 'a_out'), and 0 otherwise (for example).

As noted above, the exemplary database system 200 annotates the outliers substantially continuously, that is, as data is being ingested. In the particular example of FIG. 4, without the automatic tagging of outliers, in accordance with aspects of the invention, the user would have to manually update outliers every time new data is received, or program several triggers, which is not viable for very large volumes of data incoming at high velocity. Moreover, new data samples may change the distribution of the data (quartiles may change considerably).

In addition, bitmap indexes are well suited for Boolean analysis. Complex analytical queries 360 using the bitmap indexes can be answered using bitwise logical operations. This is important because these operations are computationally efficient to perform at query time, and also because the same dataset can be annotated with different methods. For instance, the user 320 may query samples that were not considered outliers by at least one method; or by all methods, as discussed further below in conjunction with FIG. 7. This is solved with logical operations in the bitmap index.

For ease of illustration, the exemplary cases of the invention consider a single sensor per database table. In real world scenarios, however, a table may store multiple sensors distinguished by an identification tag field.

Figure 5:
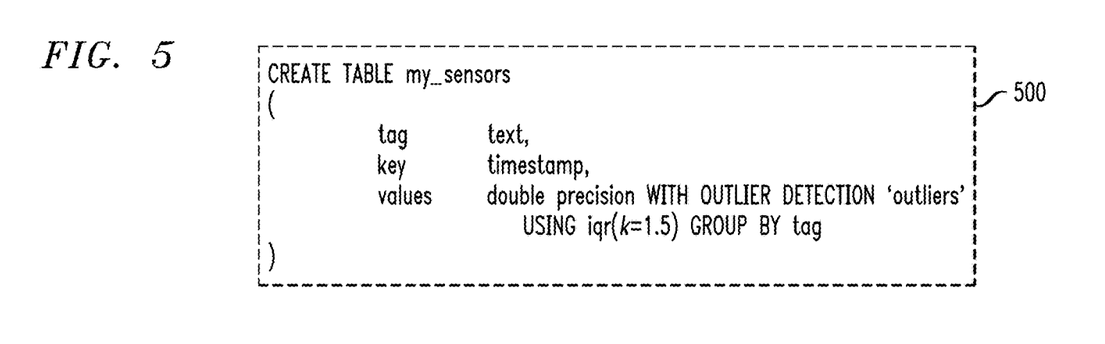

FIG. 5 illustrates alternative pseudo code 500 that creates a new table 'my_sensors' with a grouping attribute, used to store the incoming data from multiple sensors. In this case, when the user 310 creates the table, the user 310 specifies the grouping attribute (Group By tag), so that statistics or classification functions are computed separately by sensor.

Figure 6:
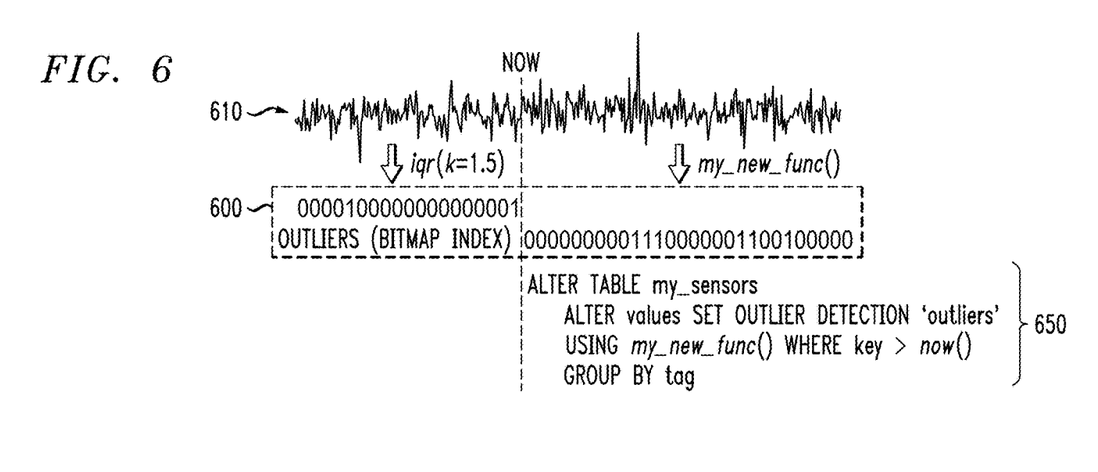

Analogously, if the user 310 redefines the definition of an outlier (relative to the function employed in FIG. 4), the user 310 can notify the system 200 of the change, by executing an extended 'alter table' statement (shown in FIG. 6). FIG.

6 illustrates a bitmap index 600 and alternative pseudo code 650 that redefines the definition of an outlier in the table 'my_sensors.' By specifying "key>now( )", the user indicates that the new definition (my_new_func) applies to data 610 ingested after the current time (now) (and does not go back and reclassify previously ingested data).

In the example of FIG. 6, the user 310 opts to not re-annotate all past data 610 using a 'where' clause that only selects data with timestamps bigger than current time (now). If the user replaces the now function with a fixed timestamp, the user 310 could specify the exact time from when the user 310 wants to re-compute the index 600. That is, the pre-annotated outliers in past data will remain outliers after the execution of the 'alter table' statement, fulfilling, however, the old specification. On the other hand, outliers in new incoming data will be annotated using the new specification.

Outlier Annotation

When analyzing data streams, it is important to process only the data items that were correctly observed. Thus, it is desirable to know, among the observed data, which samples were correctly measured and which ones were not (the outliers). Outliers are a source of bias and error on data analysis; consequently, outliers should be distinguished from non-outlier data (i.e., normal data) to be treated accordingly.

Returning to the example of FIG. 4, outliers are considered as sample values k*IQR below Q1 and k*IQR above Q3. Indeed, the criteria to identify a sample as an outlier might vary depending on the application domain. Sometimes, anything that slightly deviates from the most frequent values should be considered an outlier, whereas in other cases only values measured above high thresholds are considered abnormal data. Thus, in the present database system 200, the characterization of an outlier can be performed with different approaches, such as:

(i) Using a UDF that implements the necessary constraints;

(ii) Thresholds based on statistical metrics (e.g., removing data below/above a given percentile or using the inter-quartile range (IQR) as in the example of FIG. 4);

(iii) Supervised learning methods (e.g., users can train the database system 200 to learn which samples should be considered outliers, for example, by presenting sets of correctly measured values and sets of outliers that are used by the database system 200 to train several classifiers and refer to them by means of, e.g., a UDF that can be invoked at data ingestion time (instead of the function iqr as in the example of FIG. 4) as the function to build the corresponding index); and (iv) Hybrid approaches (users can configure the database system 200 to annotate the data streams using all outlier detection methods available. Afterwards, the database system 200 can consider majority voting on top of the bitmap index to distinguish between normal data and outliers).

Figure 7:
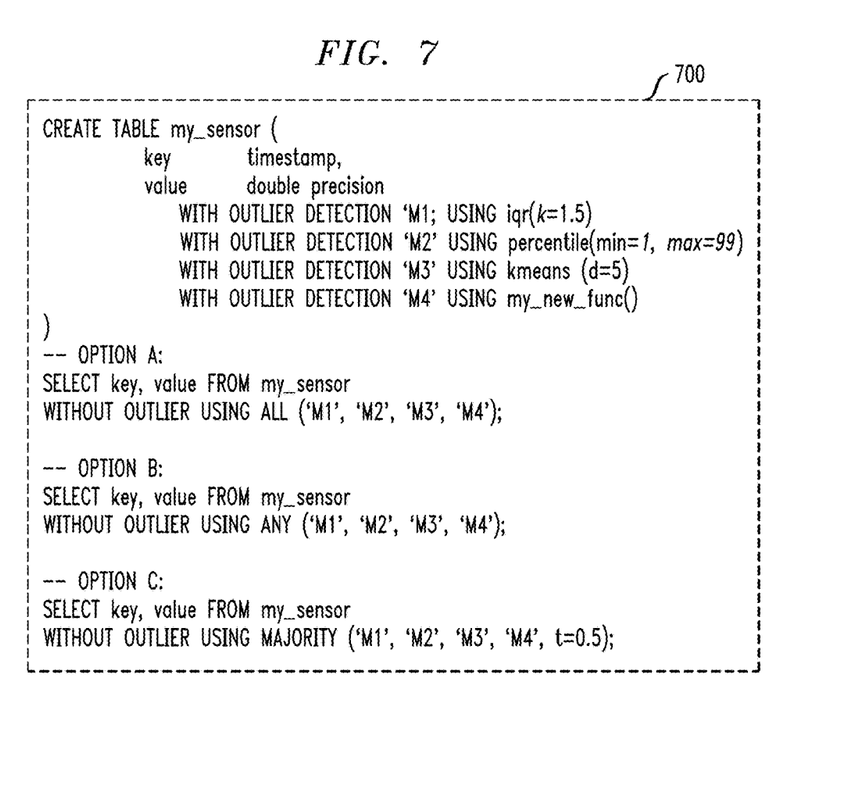

FIG. 7 illustrates alternative pseudo code 700 that creates a new table 'my_sensor' and processes a query using multiple bitmap indexes. In the example of FIG. 7, the multiple bitmap indexes are evaluated several 'USING' clauses (Options A through C) in a query. When querying tables with hybrid approaches, users can, for example, remove samples that were considered outliers by all methods (e.g., option A), by at least one of the methods (e.g., option B) or by a majority of methods (e.g., option C).

Figure 8:
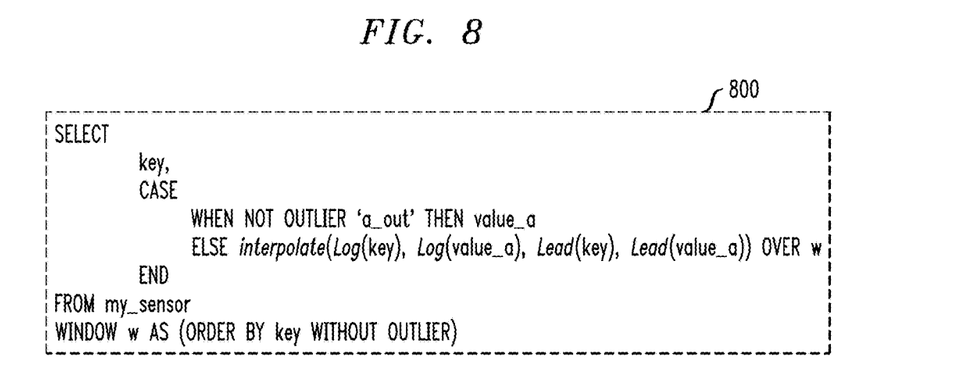

FIG. 8 illustrates an example query 800 that replaces detected outliers with interpolated values (between two non-outliers). In this manner, once the outliers are automatically annotated by the database system 200, the user 320 can declaratively query for all sample values that are not outliers, using extended SQL DML statements.

In the example of FIG. 8, the selection clause returns the original sample if the original sample is not an outlier of type 'a_out', otherwise the selection clause returns an interpolation between the last non-outlier point and the next non-outlier point. Although the CASE clauses in the query 800 are often expensive in database queries, the disclosed database system 200 improves the speed using the bitmap indexes.

Pattern Annotation

Figure 9:
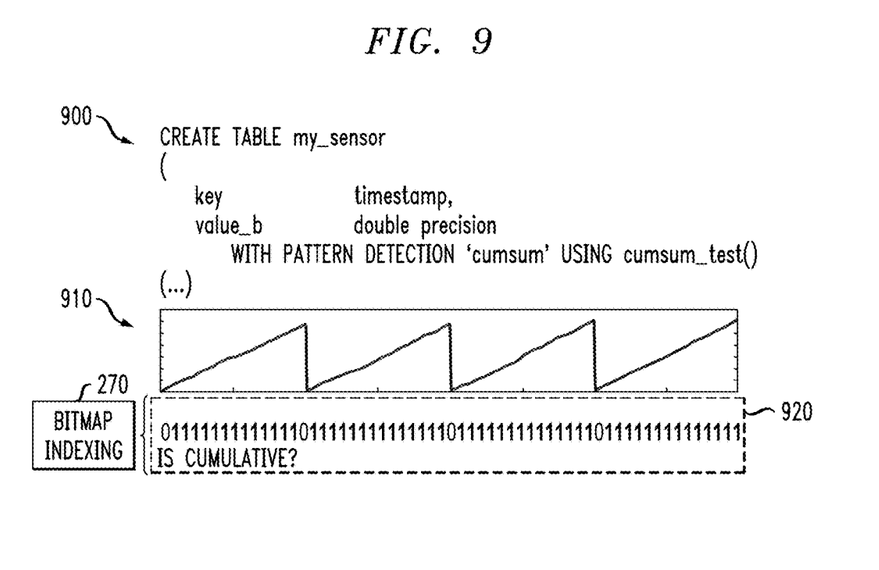

FIG. 9 illustrates exemplary pseudo code 900 for detecting a particular pattern in ingested data 910 (e.g., stored with an exemplary accumulated representation) and updating a bitmap index 920 indicating whether the particular pattern has been detected for each ingested sample. The reason to store data streams with a specific representation is usually operational. For instance, it might be easier for the industrial plant operator to interpret the cumulative value of a series, as shown in FIG. 9, instead of the current measured value. The sensor may also use compression techniques to send only the value of the difference between the current and the last observed value. Although it is not a problem to have data streams stored on their raw formats, the user may be using algorithms that require a standard representation of the data. Thus, it is important for the user to be aware of patterns in data, otherwise the results of the analysis will be wrong.

The disclosed database system 200 can learn patterns, at ingestion time, by pre-processing input data streams using a UDF specified using pseudo code 900 in the example of FIG. 9. The exemplary function cumsum_test( ) checks if several samples in a row have cumulative values and, if so, marks them in a bitmap index 920 as a pattern named 'cumsum'. When the user 320 queries the data, the function retrieves the results accordingly, along with necessary transformations.

Figure 10:
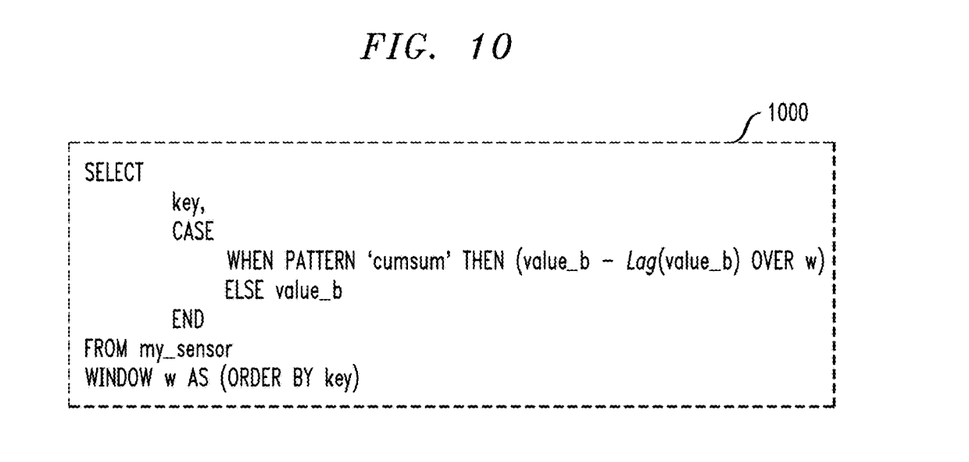

For instance, if the user 320 needs the original series, not the cumulative version, the user 320 can submit a query to transform the data. FIG. 10 illustrates an exemplary user query 1000 that applies a transformation to return the stored cumulative data in the desired original format (for example, by subtracting a current cumulative value from a prior cumulative value). As shown in FIG. 10, an exemplary lag function (available in many existing databases) returns the previous value of the series ordered by the time key. The selection clause returns the results of the subtraction if the 'cumsum' pattern was found, otherwise it returns the original value. The cumulative pattern is one exemplary case, although the database system 200 can use supervised or semi-supervised methods to discover more complex recurrent patterns in the series.

Event Annotation

Another important issue regarding data streams is event detection. There are many methods and approaches to detect events on series. Depending on the application domain, events might be well known and can be detected using similarity searches. In other domains, the system can learn events over time using machine learning techniques. It is often important to be aware of the events in order to perform fair comparisons between series and properly analyze them. The discretization of the events on the series also allows for causality studies within and among sensors.

Figure 11:
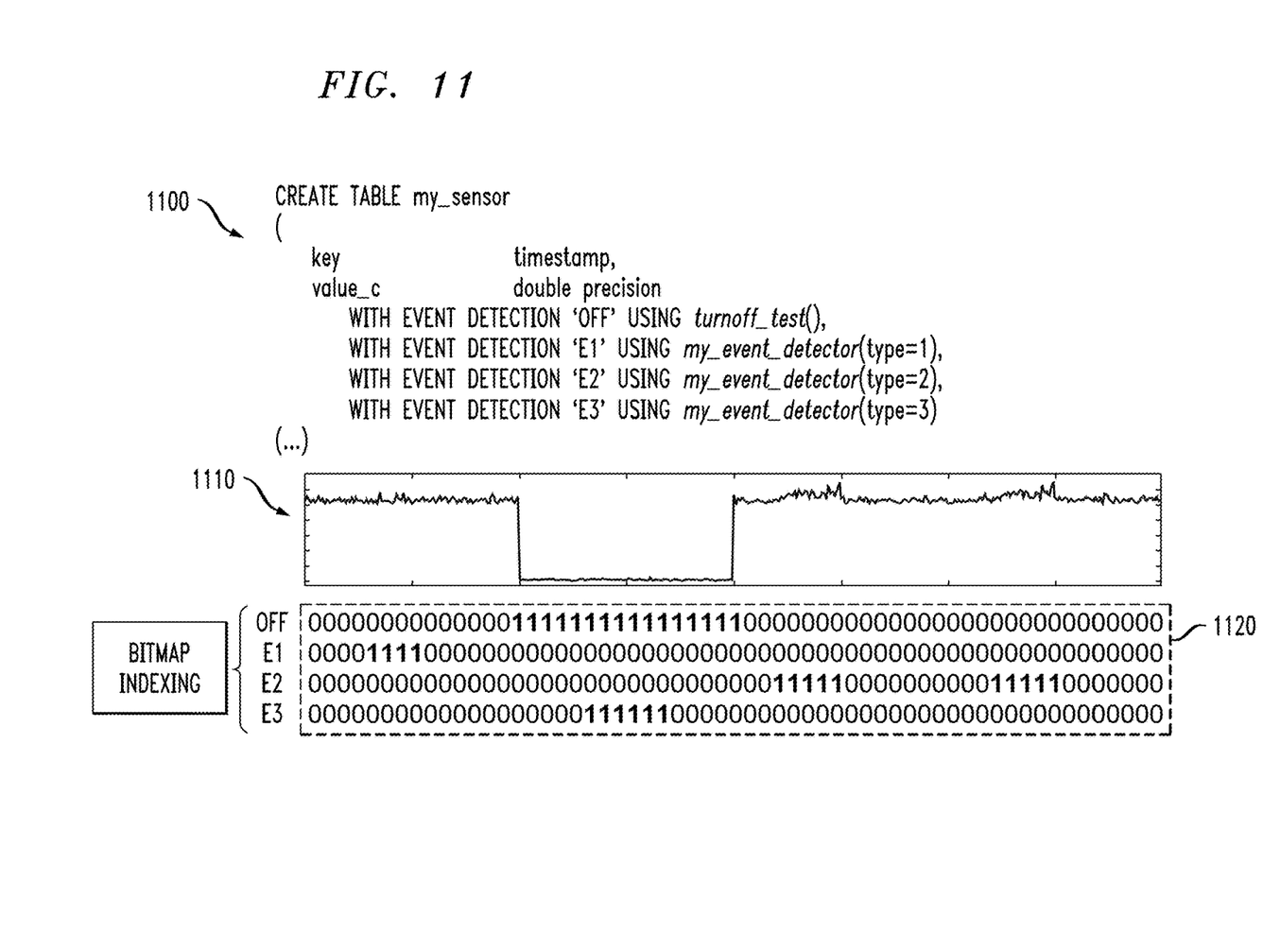

FIG. 11 illustrates exemplary pseudo code 1100 for detecting one or more events in ingested data 1110 and updating a bitmap index 1120 indicating whether each of the one or more events has been detected for each ingested sample. In the example of FIG. 11, the user 310 configures four different exemplary events (OFF, E1, E2 and E3) in the pseudo code 1100 to be automatically captured by the database system 200, during ingestion time. In addition, the bitmap index 1120 comprises a different index for each class of event.

For example, the OFF event indicates when the monitored device is turned off, as evident by the OFF bitmap index comprising binary values of 1 for the time interval that the data 1110 indicates that the device is turned off.

Figure 12:
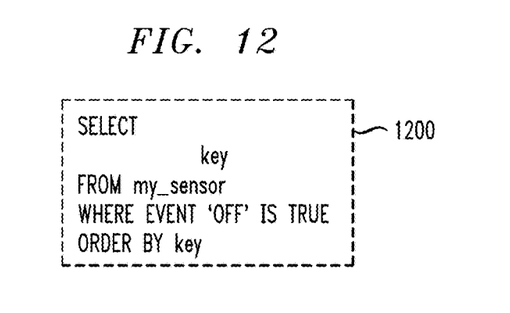

FIG. 12 illustrates an exemplary user query 1200 that queries the stored and indexed data in the data store 280 for timestamps where event 'OFF' occurs.

Figure 13:
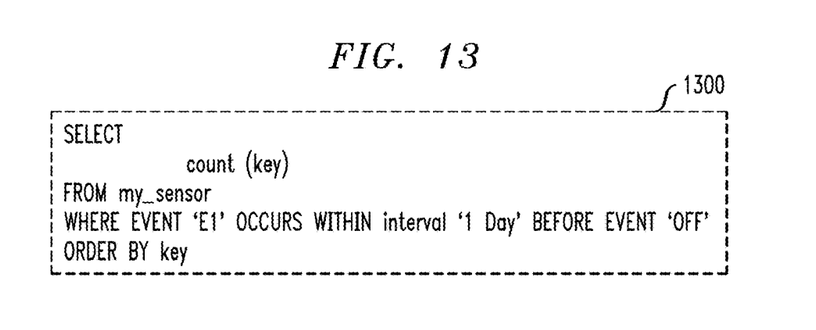

FIG. 13 illustrates an exemplary alternative user query 1300 that queries the stored and indexed data in the data store 280 for related events (e.g., when event E1 occurs within one day before an OFF event). In particular, the user query 1300 discovers the amount of times that an event 'E1' precedes an 'OFF' event within a time window of one day. This type of analysis is useful, for example, to analyze cause-effect relationships and temporal logic.

Examples

Simplifying Access to Relevant Data Analysis and Machine Learning

Data streams collected from different types of sensors are subject to regular data analysis routines, such as monitoring the accumulation of a variable over time. However, observed data may contain abnormal data, e.g., outliers, non-standard patterns and particular events, which may be harmless for daily routines. For instance, if a temperature sensor reports a 99999 value due to a malfunctioning issue, this outlier will harm the daily temperature average report. If the outlier were annotated during data ingestion, the outlier value can be easily removed from the average computation, or otherwise addressed in an appropriate manner. The same problem may occur in more complex machine learning workflows. Therefore, when data is properly annotated, in accordance with the techniques described herein, the user may establish restrictions in the analysis routines to discard or manage abnormal data.

Embedded Complex Alarm Triggering Routines

Industrial systems frequently make use of alarm triggers to warn about undesirable behaviors. The proposed database system simplifies the definition of those triggers. UDFs or other statistical analysis may define alarm zones as events to be indexed, which may be easily surveyed by traditional industrial systems.

Pattern-Aware Analysis Pipeline

Continuous analysis of collected data is a common task in stock market, industrial plants, smart cities and smart houses, among others environments. The most appropriate analysis pipeline may vary according to specific patterns or events. For instance, if a stock price starts to grow with a given pattern, it could trigger a decision support workflow to evaluate the complete stock exchange market and provide feedback in terms of what to buy and what to sell. In any analytical process, such as Machine Learning workflows, the nature of an event may dramatically change the path of the analysis. When the database provides this information already coupled with the time series at low cost, it leverages pattern-aware analyses that potentially increases the efficiency of analytic processes.

Probabilistic Monitoring of Events of Interest

On industrial plants, severe outages and catastrophic events may be the consequence of a chain of several minor precedent events. The readily available temporal query capabilities, supported by the event indexes, can be leveraged in order to identify probabilistic cause-effect relationships among relevant events in the database. Upon building a network of causality effects in the domain, a real-time monitoring functionality can be provided that indicates the probability of upcoming events, based on the current values of all measured data streams.

Information Extraction from a Set of Binary Indexes

When the sensor network is very heterogeneous or the domain knowledge is not clear to the data scientist, it may be hard to exactly define an outlier. The disclosed approach allows for the use of multiple indexes to classify the same information. Using more than one index, the user may define voting processes to decide if and when that information proceeds. Majority voting over several different criteria of outlier detection may result in a more robust outlier representation than using only one simple rule. A possible usage may consider a different weight per criteria according to an efficiency parameter (their coverage, for example) and do a weighted voting to determine the data condition (outlier or non-outlier).

CONCLUSION

Among other benefits, aspects of the present invention, outliers, patterns, and/or events can be detected in the continuously generated data (or data streams) that come from different types of sensors and electronic devices, for example, in the Internet-of-Things. Previously, outliers, patterns, and/or events were not easily identified since they are domain-dependent and not directly expressed. The disclosed database system learns from the user the necessary domain-related information to identify outliers, patterns, and/or events, which are implicitly present in the data. Once the definitions are learned, the database system can automatically annotate these desired elements at data ingestion time. Since data streams have a strong dynamic nature, users can optionally re-define what an outlier is and/or define new kinds of patterns and/or events of interest. Once annotated, the user can declaratively refer to outliers, patterns, and events anywhere in his or her query, which allows for faster and more accurate results in data analysis tasks.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 14:
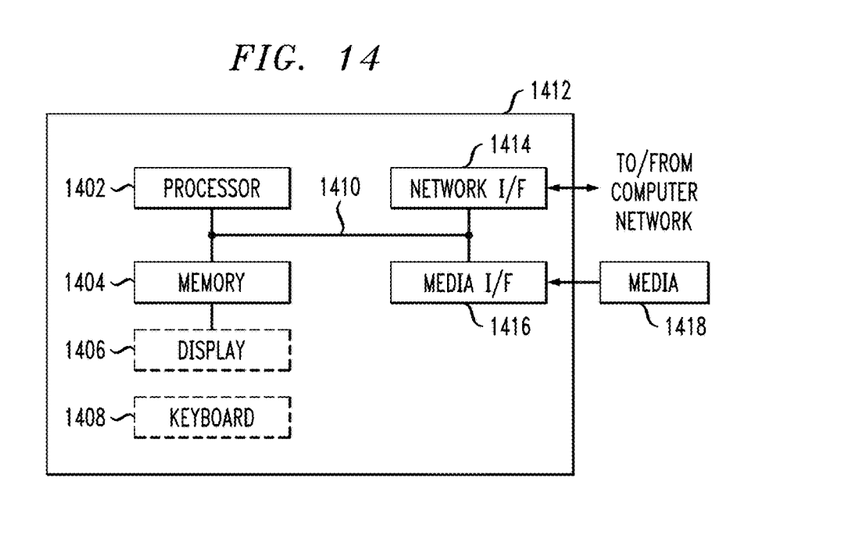

By way of example, an aspect of the present invention can make use of software running on a general purpose computer. FIG. 14 is a system diagram of an exemplary computer system on which at least one embodiment of the invention can be implemented. As depicted in FIG. 14, an example implementation employs, for example, a processor 1402, a memory 1404, and an input/output interface formed, for example, by a display 1406 and a keyboard 1408. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1402, memory 1404, and input/output interface such as display 1406 and keyboard 1408 can be interconnected, for example, via bus 1410 as part of a data processing unit 1412. Suitable interconnections via bus 1410, can also be provided to a network interface 1414 (such as a network card), which can be provided to interface with a computer network, and to a media interface 1416 (such as a diskette or compact disc read-only memory (CD-ROM) drive), which can be provided to interface with media 1418.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1402 coupled directly or indirectly to memory elements 1404 through a system bus 1410. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1408, displays 1406, and pointing devices, can be coupled to the system either directly (such as via bus 1410) or through intervening I/O controllers.

Network adapters such as network interface 1414 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1412 as depicted in FIG. 14) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
    obtaining a domain-dependent definition of one or more of data outliers based on one or more predefined outlier criteria, data patterns based on one or more predefined pattern criteria, and data events based on one or more predefined event criteria;
    obtaining, into a database system, real-time time series measurement data from a plurality of sensors;
    determining, substantially simultaneously with said obtaining said real-time time series measurement data, using at least one processing device, whether individual samples in the measurement data satisfy said domain-dependent definitions of said one or more of said data outliers, said data patterns and said data events; and
    storing said individual samples in the database system using the at least one processing device, with an indication of whether said individual samples satisfy said domain-dependent definitions of said one or more of said data outliers, said data patterns and said data events.

2. The method of claim 1, wherein one or more users specify said domain-dependent definitions using a declarative command language.

3. The method of claim 2, wherein said domain-dependent definitions using said declarative command language can include one or more of: system calls to custom functions, defined by said one or more users, that implement necessary constraints that enable said determining; one or more constraints based on statistical metrics of said measurement data; and system calls to machine learning algorithms to train a specialized model from said measurement data.

4. The method of claim 2, wherein said domain-dependent definitions comprise a specification of a sampling selection criterion that specifies one or more of which and how many of said individual samples from said measurement data are used to compute one or more of said statistical metrics and said specialized model.

5. The method of claim 2, wherein one or more users specify said domain-dependent definition at a substantially same time as said one or more users create one or more tables that will store said measurement data.

6. The method of claim 1, wherein said indication comprises a bitmap, and wherein said bitmap is updated substantially simultaneously with said obtaining.

7. The method of claim 1, further comprising the step of receiving an update to said domain-dependent definition from one or more users.

8. The method of claim 5, wherein said update further comprises an indication of a specific time from which said update applies to said measurement data.

9. The method of claim 1, further comprising the step of receiving a query from one or more users, wherein said query comprises one or more declarative statements that reference and manipulate one or more or a logical combination of said data outliers, said data patterns and said data events.

10. A computer program product comprising a tangible machine-readable storage medium having encoded therein executable code of one or more software programs, wherein the one or more software programs when executed perform the following steps:

obtaining a domain-dependent definition of one or more of data outliers based on one or more predefined outlier criteria, data patterns based on one or more predefined pattern criteria, and data events based on one or more predefined event criteria;

obtaining, into a database system, real-time time series measurement data from a plurality of sensors;

determining, substantially simultaneously with said obtaining said real-time time series measurement data, using at least one processing device, whether individual samples in the measurement data satisfy said domain-dependent definitions of said one or more of said data outliers, said data patterns and said data events; and     storing said individual samples in the database system using the at least one processing device, with an indication of whether said individual samples satisfy said domain-dependent definitions of said one or more of said data outliers, said data patterns and said data events.

11. The computer program product of claim 10, wherein said indication comprises a bitmap, and wherein said bitmap is updated substantially simultaneously with said obtaining.

12. The computer program product of claim 10, further comprising the step of receiving an update to said domain-dependent definition from one or more users.

13. The computer program product of claim 12, wherein said update further comprises an indication of a specific time from which said update applies to said measurement data.

14. The computer program product of claim 10, further comprising the step of receiving a query from one or more users, wherein said query comprises one or more declarative statements that reference and manipulate one or more or a logical combination of said data outliers, said data patterns and said data events.

15. A system, comprising:
    a memory; and
    at least one processing device, coupled to the memory, operative to implement the following steps:

obtaining a domain-dependent definition of one or more of data outliers based on one or more predefined outlier criteria, data patterns based on one or more predefined pattern criteria, and data events based on one or more predefined event criteria;

obtaining, into a database system, real-time time series measurement data from a plurality of sensors;

determining, substantially simultaneously with said obtaining said real-time time series measurement data, using the at least one processing device, whether individual samples in the measurement data satisfy said domain-dependent definitions of said one or more of said data outliers, said data patterns and said data events; and     storing said individual samples in the database system using the at least one processing device, with an indication of whether said individual samples satisfy said domain-dependent definitions of said one or more of said data outliers, said data patterns and said data events.

16. The system of claim 15, wherein one or more users specify said domain-dependent definitions using a declarative command language.

17. The system of claim 15, wherein said indication comprises a bitmap, and wherein said bitmap is updated substantially simultaneously with said obtaining.

18. The system of claim 15, further comprising the step of receiving an update to said domain-dependent definition from one or more users.

19. The system of claim 18, wherein said update further comprises an indication of a specific time from which said update applies to said measurement data.

20. The system of claim 15, further comprising the step of receiving a query from one or more users, wherein said query comprises one or more declarative statements that reference and manipulate one or more or a logical combination of said data outliers, said data patterns and said data events.

* * * * *

UNITED STATES PATENT AND TRADEMARK OFFICE
CERTIFICATE OF CORRECTION

| | | |
|---|---|---|
| PATENT NO. | : 10,409,817 B1 | Page 1 of 1 |
| APPLICATION NO. | : 15/080756 | |
| DATED | : September 10, 2019 | |
| INVENTOR(S) | : Jonas F. Dias et al. | |

It is certified that error appears in the above-identified patent and that said Letters Patent is hereby corrected as shown below:

On the Title Page

Item (57) In the Abstract, Line 16, replace "Query" with --Queries--.

Signed and Sealed this
Tenth Day of December, 2019

Andrei Iancu
*Director of the United States Patent and Trademark Office*